(12) United States Patent
Airoldi

(10) Patent No.: US 6,863,101 B2
(45) Date of Patent: Mar. 8, 2005

(54) INSERTION DEVICE FOR SNOW CHAINS

(75) Inventor: Romolo Airoldi, Lecco (IT)

(73) Assignee: König SpA, Molteno (IT)

( * ) Notice: Subject to any disclaimer, the term of this patent is extended or adjusted under 35 U.S.C. 154(b) by 0 days.

(21) Appl. No.: 10/367,896

(22) Filed: Feb. 19, 2003

(65) Prior Publication Data

US 2003/0188816 A1 Oct. 9, 2003

(30) Foreign Application Priority Data

Mar. 27, 2002 (IT) .................................. MI20020163 U

(51) Int. Cl.7 ............................................. B60C 27/00
(52) U.S. Cl. .................................. 152/213 R; 188/32
(58) Field of Search ...................... 152/213 R; 188/32; 405/118, 119; 52/16

(56) References Cited

U.S. PATENT DOCUMENTS

| | | | | |
|---|---|---|---|---|
| 2,612,239 A | * | 9/1952 | Watkins ....................... 188/32 |
| 3,532,149 A | * | 10/1970 | McCord .................. 152/213 R |
| 3,810,530 A | * | 5/1974 | Jay .............................. 188/32 |
| 3,893,500 A | * | 7/1975 | Planz ..................... 152/213 R |
| 4,103,870 A | | 8/1978 | Murakami |
| 4,693,633 A | * | 9/1987 | Giordano .................... 405/119 |
| 4,709,432 A | * | 12/1987 | Barrick .......................... 7/100 |
| 4,828,076 A | * | 5/1989 | Fox .............................. 188/32 |
| 4,956,948 A | * | 9/1990 | Hart .............................. 52/16 |
| 5,548,931 A | * | 8/1996 | Bryant .......................... 52/11 |
| 6,240,680 B1 | * | 6/2001 | Estes ............................. 52/16 |

OTHER PUBLICATIONS

European Search Report dated Oct. 16, 2003.

* cited by examiner

Primary Examiner—Russell D. Stormer
(74) Attorney, Agent, or Firm—Nixon & Vanderhye, P.C.; Frank P. Presta

(57) ABSTRACT

A description is given of an insertion device for snow chains, comprising a base (2) designed to be rested on the ground, and two lateral walls (3) which rise up from the base to form a channel for insertion of the internal ring (15) of a snow chain, in such a way that the internal ring (15) of the snow chain can be made to pass behind the wheel of the vehicle.

10 Claims, 3 Drawing Sheets

INSERTION DEVICE FOR SNOW CHAINS

DESCRIPTION

The present invention relates to an insertion device for snow chains, in particular for insertion of the internal ring of the snow chain in the gap between a pair of twinned wheels of vehicles such as trucks, buses and the like.

Specific reference will later be made to the twinned wheels of a truck, without prejudice to the fact that the insertion device according to the invention can also be used for single wheels of any type of vehicle travelling on tyres.

As is known, a snow chain comprises, in general, two lateral elements (flexes, steel wires, cables or the like), which in the condition of use are closed as a ring on the side of the wheel facing inwards and on the side of the wheel facing outwards respectively. These lateral elements, hereinafter referred to as internal ring and external ring in accordance with their position on the wheel, are connected by a series of chain sections varyingly arranged to create friction on the tread, all this completed by a device for the tautening of said lateral elements, known as a tightener.

For assembly of the snow chains on a tyre, the internal ring has to be made to pass behind the wheel, so as to be closed and tautened by the tightener. The operation of passing the internal ring behind the wheel is somewhat awkward and complicated for the user. In fact the chain sections connected to the internal ring often end up under the wheel tread, jamming and blocking the forward movement of the internal ring. Consequently the user has to release the chain sections from the tread of the wheel and repeat the operation of passing the internal ring behind the wheel.

This operation is particularly complicated, above all in the case of twinned wheels of trucks, wherein the user has to try to make the internal ring pass in the gap between a pair of twinned wheels. In fact in this case the user has to work in small spaces since the gap between a pair of twinned wheels is generally 6 cm–10 cm approximately.

Moreover this operation is further complicated by the considerable weight of the snow chains, which can weigh around 10 kg–16 kg, considering that they are fitted for truck wheels having considerable diameters.

Again this operation is further complicated by the plurality of hooks provided in the chain sections, designed to pre-tighten the same. In fact these hooks constitute parts which project in relation to the chain sections and often get jammed under the tread of the wheel during passing of the internal ring behind the wheel.

The object of the present invention is to eliminate the disadvantages of the prior art by providing an insertion device for snow chains which is practical, compact, economical and easy to manufacture.

Another object of the present invention is to provide such an insertion device for snow chains which is versatile and suitable for use for the insertion of various types of snow chains.

These objects are achieved in accordance with the invention with the features listed in the attached independent claim 1.

Advantageous embodiments of the invention are disclosed by the dependent claims.

The insertion device for snow chains, according to the invention, comprises a base suitable for being rested on the ground and two lateral walls which rise up from the base to form a channel for insertion of the internal ring of a snow chain. In this way the internal ring of the snow chain can be made to pass behind the wheel of the vehicle, guided in the channel of the insertion device, without the problem of the chain sections or the hooks of the snow chain blocking under the tread of the vehicle wheel.

Further features of the invention will be made clearer by the following detailed description, referred to its embodiments, given merely as non-limiting examples and illustrated in the accompanying drawings, in which.

Figure 1:
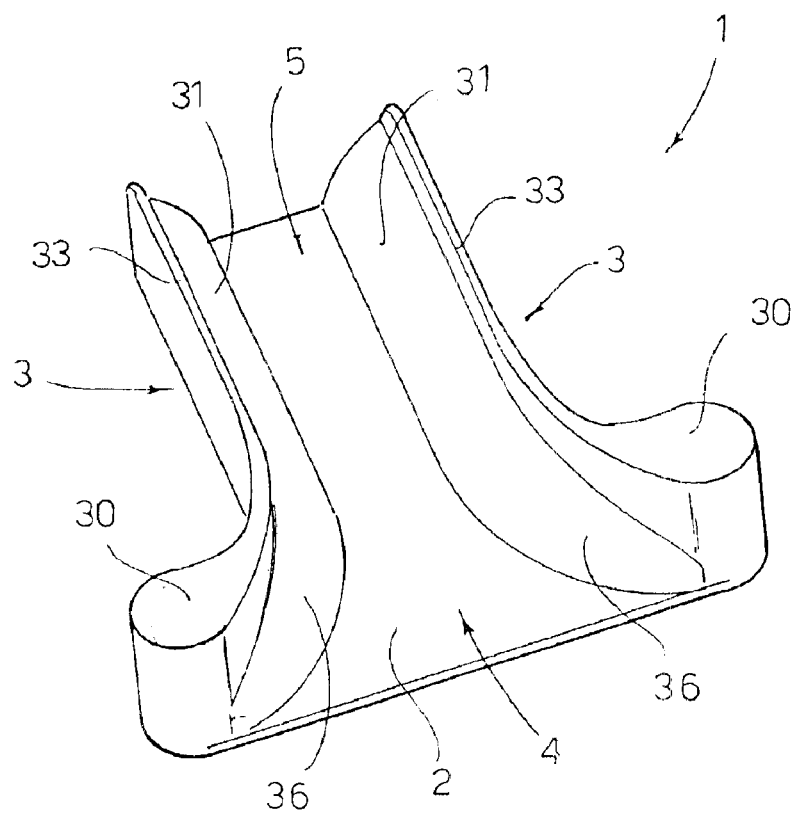
FIG. 1 is a perspective view illustrating an insertion device for snow chains, according to a first embodiment.

Referring to FIG. 1 an insertion device for snow chains is illustrated, according to a first embodiment of the invention. The insertion device, denoted overall by reference numeral 1, comprises a substantially flat base 2 wherefrom two lateral walls 3 rise up.

The base 2 has a lower surface suitable for being placed on the ground and has a substantially T-shaped configuration in a plan view. Accordingly, the two lateral walls 3 have a substantially J-shaped configuration. Each lateral wall 3 has a straight rear part 33 and a front curved connection part 30 diverging outwards in relation to the straight rear part.

Both the internal surface 36 of the curved front part 30 of the lateral wall and the internal surface 31 of the rear part 33 of the lateral wall are substantially rounded or bevelled with decreasing thickness from the base 2 upwards.

The insertion device 1 therefore behaves as a guide comprising an insertion channel defined on the base 2 between the two lateral walls 3. The insertion channel has an entrance 4 having a width substantially greater than the exit 5, so as to act as access for insertion. In the insertion device 1, the path of insertion along the insertion channel is linear.

The insertion device 1 has a front access part defined by the two diverging front portions 30 of the lateral walls having a greater width in relation to the rear part defined by the two rear portions 33 of the lateral walls.

The width of the rear part of the insertion device is preferably slightly smaller than the width of the gap between two twinned wheels. Instead the rear part of the insertion device has a slight greater width compared to the width of the gap between two twinned wheels.

Generally in twinned wheels of trucks the width of the gap between the pair of twinned wheels is approximately 8 cm. The rear part of the device has a width slightly smaller than 8 cm and the front part of the device has a width of approximately 18 cm.

Figure 2:
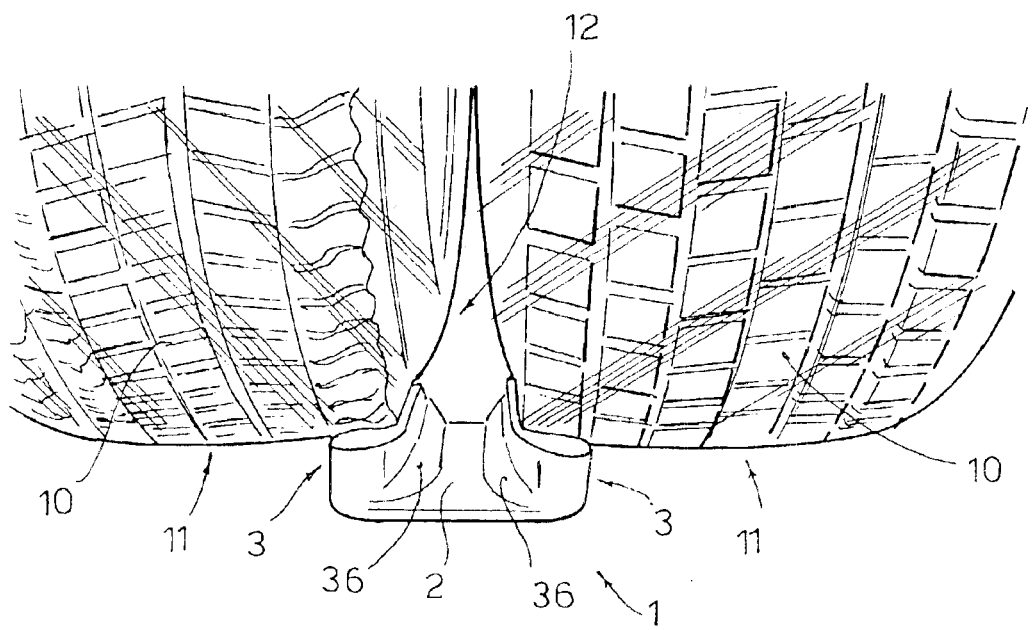
FIG. 2 is a front perspective view, schematically illustrating the device of FIG. 1 placed in abutment against the tread of a pair of twinned wheels shown broken off.

As shown in FIG. 2, the insertion device 1 is placed in abutment against the tread 11 of a pair of twinned wheels 10, at the gap 12 between the pair of twinned wheels. Since the rear part of the insertion device 1 has a slightly smaller width compared tot he width of the gap 12 between the pair of wheels, it can be inserted in this gap until the front part of the insertion device in abutment against the tread 11 of the twinned wheels.

Figure 3:
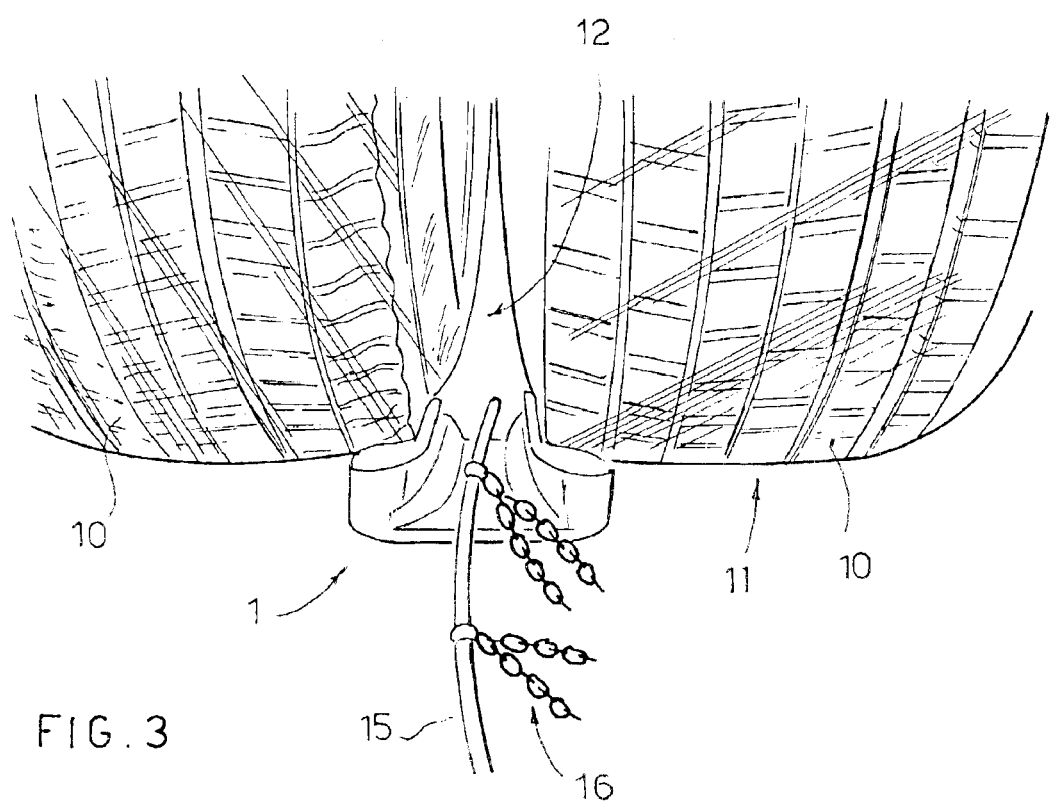
FIG. 3 is a front perspective view like FIG. 2, schematically illustrating the insertion of the internal ring of a snow chain by means of the insertion device of FIG. 1.

At this point, as shown in FIG. 3, the internal ring 15 of a snow chain, of which some sections 16 are shown, is inserted, via the insertion device 1, in the gap 12 defined between the two twinned wheels 10.

It should be noted that the internal bevelled surfaces 36 and 31 of the lateral walls 3 guide the chain sections 16 and the hooks connected thereto, placing them in a compact vertical configuration and preventing them from jamming under the tread 11 of the wheels.

Figure 4:
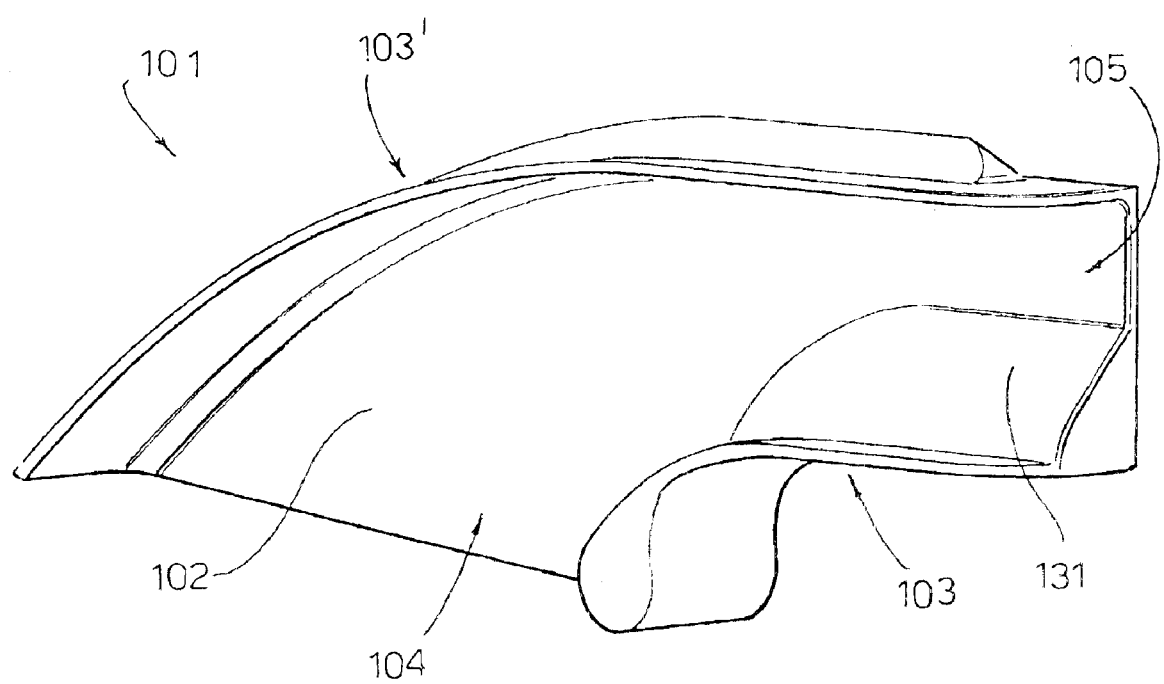
FIG. 4 is a perspective view like FIG. 1, illustrating an insertion device for snow chains, according to a second embodiment of the invention.

FIG. 4 shows an insertion device 101 according to a second embodiment of the invention. The insertion device 101 has a substantially J-shaped base seen in a plan view with a first lateral J-shaped wall 103 and a second substantially curved lateral wall 103' with a greater radius of curvature compared to the wall 103.

The lateral wall 103 with smaller radius of curvature has a substantially bevelled or rounded internal surface 131.

It should be noted that the entrance part 104 is always wider than the exit part 105, so as to form access for insertion of the internal ring of the chain. Moreover in this case the insertion channel follows a curved path with an elbow curve.

Figure 5:
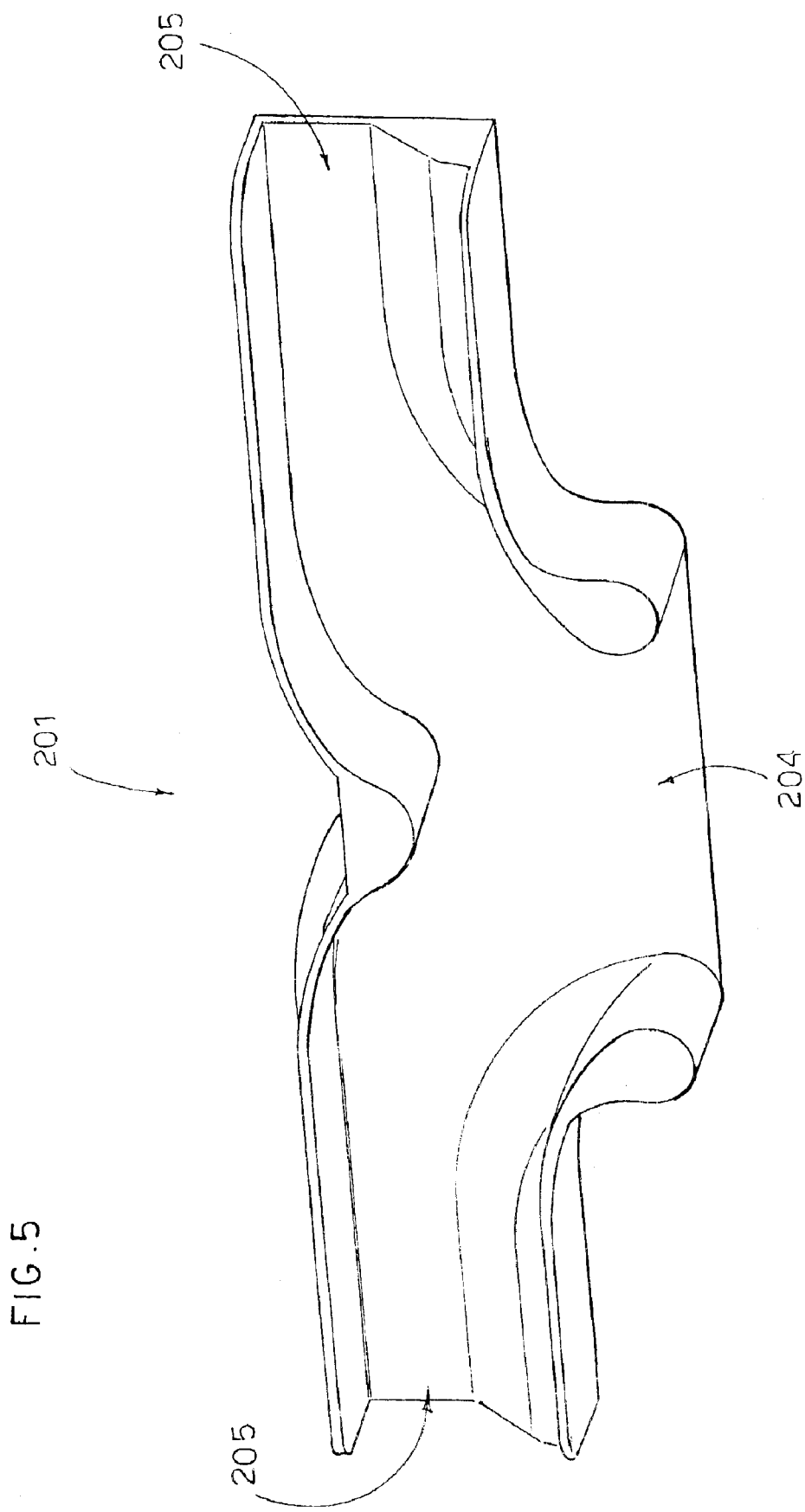
FIG. 5 is a perspective view like FIG. 1, illustrating an insertion device for snow chains, according to a third embodiment of the invention.

FIG. 5 shows an insertion device 201 according to a third embodiment of the invention. The insertion device 201 is obtained from two insertion devices 101 according to the second embodiment, so as to define an entrance 204 and two exits 205 placed on the right and on the left in relation to the entrance 204.

As a result, the insertion device 201 defines two insertion channels which follow a curved elbow path, a first insertion channel directed to the left in relation to the entrance 204 and a second insertion channel directed to the right in relation to the entrance 204.

In this way the device 201 can be used irrespectively for insertion of the snow chains behind the wheels placed on the right side of the vehicle and on the left side of the vehicle.

The insertion device according to the invention is preferably made in a single part by injection moulding of plastic. However it can also be made in other materials, for example in sheet metal.

A number of modifications and changes of detail can be made to the present embodiments of the invention, within the reach of a person skilled in the art, without departing from the scope of the invention as set forth in the appended claims.

What is claimed is:

1. An insertion device for facilitating the installation of a snow chain on the wheel of a vehicle, said insertion device comprising a base (2) suitable for being positioned on the ground adjacent to a vehicle wheel and two lateral walls (3) which rise up from said base to form an open elongated channel for insertion of the internal ring (15) of a snow chain, in such a way that said internal ring (15) of the snow chain can be made to pass behind the wheel of a vehicle disposed adjacent to the insertion device without interference with the wheel, said lateral walls (3) being free of any obstruction connecting the upper ends thereof.

2. A device (1) according to claim 1, characterised in that it is made in a single part by injection molding.

3. A device according to claim 1, characterised in that said lateral walls (3) of the insertion device have a diverging front part (30) and a straight rear part (33), so as to form an entrance (4) of the channel having a greater width than the exit (5) of the channel.

4. An insertion device for facilitating the installation of a snow chain on the wheel of a vehicle, said insertion device comprising a base (2) suitable for being positioned on the ground adjacent to a vehicle wheel and two lateral walls (3) which rise up from said base to form an open elongated channel for insertion of the internal ring (15) of a snow chain, in such a way that said internal ring (15) of the snow chain can be made to pass behind the wheel of a vehicle disposed adjacent to the insertion device without interference with the wheel, characterised in that said lateral walls (3) of the insertion device have a curved and diverging front part (30) and a straight rear part (33), so as to form an entrance (4) of the channel having a greater width than the exit (5) of the channel.

5. A device according to claim 4, characterised in that it has a front part having a greater width compared to the width of the rear part.

6. A device according to claim 5, characterised in that the width of the rear part of the insertion device is slightly smaller than the width of the gap (12) formed between dual wheels (10) of a vehicle so that they can be inserted in said gap (12) and the width of the front part of the insertion device is slightly greater than the width of the gap (12) formed by the dual wheels (10), in such a way that the rear part of the insertion device can abut against the tread (11) of the dual wheels.

7. An insertion device for facilitating the installation of a snow chain on the wheel of a vehicle, said insertion device comprising a base (2) suitable for being positioned on the ground adjacent to a vehicle wheel and two lateral walls (3) which rise up from said base to form an open elongated channel for insertion of the internal ring (15) of a snow chain, in such a way that said internal ring (15) of the snow chain can be made to pass behind the wheel of a vehicle disposed adjacent to the insertion device without interference with the wheel, characterised in that the internal surface (31, 36) of said lateral walls of the device is substantially rounded and beveled.

8. An insertion device for facilitating the installation of a snow chain on the wheel of a vehicle, said insertion device comprising a base (2) suitable for being positioned on the ground adjacent to a vehicle wheel and two lateral walls (3) which rise up from said base to form an open elongated channel for insertion of the internal ring (15) of a snow chain, in such a way that said internal ring (15) of the snow chain can be made to pass behind the wheel of a vehicle disposed adjacent to the insertion device without interference with the wheel, characterised in that said base (2) has a substantially T shape in a plan view and said lateral walls have a substantially J shape in a plan view with the curved parts of the J diverging one in relation to the other.

9. An insertion device for facilitating the installation of a snow chain on the wheel of a vehicle, said insertion device comprising a base (2) suitable for being positioned on the ground adjacent to a vehicle wheel and two lateral walls (3) which rise up from said base to form an open elongated channel for insertion of the internal ring (15) of a snow chain, in such a way that said internal ring (15) of the snow chain can be made to pass behind the wheel of a vehicle disposed adjacent to the insertion device without interference with the wheel, characterised in that the insertion channel of said insertion device follows a curved path along an elbow curve.

10. An insertion device for facilitating the installation of a snow chain on the wheel of a vehicle, said insertion device comprising a base (2) suitable for being positioned on the ground adjacent to a vehicle wheel and two lateral walls (3) which rise up from said base to form an open elongated channel for insertion of the internal ring (15) of a snow chain, in such a way that said internal ring (15) of the snow chain can be made to pass behind the wheel of a vehicle disposed adjacent to the insertion device without interference with the wheel, characterised in that the device (201) has two insertion channels, one which follows an elbow curve to the left in relation to the entrance (204) and the other which follows an elbow curve to the right in relation to the same entrance (204).

* * * * *